Patented Oct. 26, 1937

2,096,769

UNITED STATES PATENT OFFICE 2,096,769

TREATMENT OF HYDROCARBON OIL

Hans Tropsch, Chicago, Ill., assignor to Universal Oil Products Company, Chicago, Ill., a corporation of Delaware No Drawing. Application December 24, 1934, Serial No. 759,066

3 Claims. (Cl. 196—52)

This application is a continuation in part of my co-pending application, Serial No. 619,968, filed June 29, 1932.

This invention relates more particularly to the treatment of hydrocarbon motor fuels of low antiknock value, such as straight run gasolines produced from paraffinic crudes though the process is also applicable for improving the knock rating of gasoline fractions from other sources, for example, those from naphthenic base crudes and from cracking processes.

In a more specific sense the invention has reference to a catalytic process which may be operated at ordinary atmospheric pressures and which constitutes an improvement over the usual high pressure reforming operations on gasolines in that a minimum of cracking occurs in the ordinarily accepted sense of the term and the yields of desired product are higher for corresponding conditions. Further objects and advantages will become apparent in the following description of the nature of the process.

As a general rule the antiknock value of a hydrocarbon motor fuel mixture increases with its content of olefinic and cyclic (particularly aromatic) compounds. This rule cannot be stated as absolute since experiments on pure compounds have shown that the knock rating is also a function of such factors as the length of the straight chain in the paraffin hydrocarbons, the position of the double bond in corresponding olefins, the degree of partial or complete saturation of the cyclic hydrocarbons and the presence of minor amounts of substances which may exert an accelerating or a retarding influence upon the rate of combustion of the fuel. While it may be stated generally that the antiknock value of a hydrocarbon fuel mixture is increased by loss of hydrogen in decomposition reactions of any character, other reactions may also take place such as isomerization involving the formation of branched chain saturated and unsaturated hydrocarbons and the formation of hydrocarbons of a mixed straight chain and cyclic character. The reactions involved in the treatments of the present process are apparently distinct from those which occur in ordinary cracking operations.

In one specific embodiment the invention comprises treatment of hydrocarbon motor fuels in heated vaporous condition at temperatures and for time periods at which substantially no cracking occurs in the absence of catalysts, in the presence of catalysts comprising activated aluminum oxide, the process comprising also the regeneration of depreciated catalysts by treatment with oxygen or oxygen-containing gases at such times as tarry or carbonaceous deposits have rendered them ineffective.

Aluminum oxide to be used as a catalyst within the scope of the present invention must be prepared in a definite manner if good catalytic activity is to be assured. It is of primary importance that the prepared alumina catalysts should be purified from occluded or absorbed salts and that they should have been heated only to a certain maximum temperature, to avoid complete dehydration. The preferred method of manufacture is to precipitate aluminum hydroxide from solutions of aluminum salts such as the alums, the aluminates, etc., under conditions conducive to the formation of more or less granular and readily washable precipitates by using in the case of the alums such precipitating reagents as ammonium hydroxide, caustic alkalies and alkali metal carbonates and in the case of the aluminates dilute mineral acids. The method of precipitation from sodium aluminate by adding dilute sulfuric acid is both convenient and effective. The precipitate obtained is fairly compact and can be readily washed by decantation before filtering, using water at the boiling temperature. By repeatedly disintegrating and washing the precipitate with intermediate filtering, a hydroxide is prepared which is practically free from other salts.

The precipitated hydroxide is then calcined under temperatures within the approximate range of 400 to 500° C. and only for such time as can be employed without rendering the material insoluble at ordinary temperatures in moderately concentrated alkali solutions and dilute sulfuric acid. The water content of material prepared in this manner is usually somewhere within the range of from 5 to 10 percent and may correspond to a certain percentage of the monohydrate having the formula $Al_2O_3 \cdot H_2O$ or $AlO(OH)$.

Experience indicates that aluminum oxide catalyst prepared under conditions other than those specified is greatly inferior in catalytic properties. Thus the ignition of the natural oxide minerals whose names and formulas are listed below does not yield catalysts of the same type as those resulting from the careful purification and calcination of the precipitated hydroxide.

Aluminum oxide minerals

| | |
|---|---|
| Diaspore | $Al_2O_3 \cdot H_2O$ |
| Bauxite | $Al_2O_3 \cdot 2H_2O$ |
| Gibbsite | $Al_2O_3 \cdot 3H_2O$ |

Similarly the direct ignition of other salts such as the sulfates, the hydrated chlorides, the nitrate, etc. and the preparation of oxide by direct oxidation of the metal do not produce catalysts comparable with the type preferred in the present process.

The type of equipment which may be used in catalytically dehydrogenating and reforming gasolines according to the present process in commercial installations is relatively simple and may consist merely of ordinary tubular heaters of suitable design and capacity for containing the catalyst and permitting the passage of the oil vapors therethrough without too great pressure drop. It may be of advantage to utilize the vapors from shell stills or fractionating equipment and superheat them if necessary, prior to their passage over or through the catalyst particles in an unheated chamber, or the chamber may be heated externally. In any case the vapors from the catalyst chamber may be further fractionated or cooled and condensed as a whole, after which they may be stabilized by the removal of any excess of low boiling hydrocarbons such as propane and butanes and given any further light treatment that may be necessary to produce a stable refined gasoline. The fineness of the contact material and the use of added inert spacing materials will be determined by a consideration of the degree of treatment necessary to effect a given increase in octane number upon any oil vapors which are subjected to the treatment. The fineness of the catalyst which is most suitable in any given case will be largely a matter of trial though oxides composed of particles between 10 and 30 mesh or still coarser particles have given good results. Operations may be conducted continuously by employing catalyst chambers connected in parallel permitting the use of one chamber for a period of time corresponding to efficient activity of the catalyst while the catalysts in other chambers are being regenerated by air or other oxygen-containing gases.

The preferred temperature range for the treatments is from 450 to 600° C. (842 to 1112° F.) though the range most generally applicable is from 475 to 525° C. (887 to 977° F.). It has been found that in the relatively short times employed (usually less than 5 seconds) that in the absence of catalysts substantially no cracking or refining action takes place upon gasoline vapors when merely heated at atmospheric pressure within the temperature ranges mentioned. However, in the presence of the preferred aluminum oxide catalysts, a definite improvement has been noted in increased antiknock value and lowering in gum and sulfur content. The present type of catalyst also furthers desulfurization reactions to a considerably greater extent and for a longer period of time than most catalysts used for the same general purposes.

The time of contact of hydrocarbon vapors with catalysts of the character comprised within the scope of the present invention is generally low which gives a high capacity to any given set of equipment which may be employed. Times of contact from two to twenty seconds are generally sufficient though longer times of contact have been used in extreme cases depending on the catalyst and the results desired.

As an example of the preparation of a catalyst and its use and regeneration in refining a naphtha, the following is given as typical: An alumina catalyst was prepared from a solution of 500 parts by weight of crystallized aluminum sulfate in 1500 parts of water. Aluminum hydroxide was precipitated by adding 5000 parts of a 20 percent ammonia solution at a temperature of 50° C., the solution being stirred during the addition of the precipitant and a half hour being consumed in its addition. The precipitate was again heated for half an hour with ammonia solution at 60° C. and given a final thorough washing. The washed particles were then carefully heated at about 200° C. to remove mechanically entrained and absorbed water and were then heated at a temperature of 400° C. in a stream of air until they attained a constant weight as indicated by no further evolution of water.

10 to 30 mesh particles of the catalyst prepared by the method given in the preceding paragraph was used to treat a Mexican intermediate naphtha fraction having an initial boiling point of 160° C., a final boiling point of 213° C., an octane number of 18 and a sulfur content of 0.27 percent. The vapors of this naphtha were passed over the catalyst at 500° C. at atmospheric pressure. The recovered naphtha had an octane number of 54 and a sulfur content of 0.03 percent, the yield being 92.4 percent of the starting material. The loss was entirely due to gas formation and the gas had the average molecular weight of 12.1 percent which indicated a considerable quantity of hydrogen.

The effectiveness of the catalyst used in the example increased during 4 days of service and it was observed in this and other cases that this increase in efficiency seemed to run concurrently with the deposition of a small amount of carbon on the surface of the catalyst. However, after attaining a maximum activity the efficiency as measured by the increase in antiknock value obtained dropped off and the mass was regenerated by passing air through it at approximately the same temperature that was employed in the oil treatment. This ease of regeneration to completely restore the effectiveness of the catalyst is an important feature of the present process as this method of regeneration is simple and easily conducted. Air acts somewhat more slowly than pure oxygen in effecting the burning off of excess carbon deposit and the restoration of catalytic activity though it is generally to be preferred from a standpoint of cost and general economy. However, the use of oxygen or ozone makes possible the restoration of properties in a much shorter time than when air is used and it is comprised within the scope of the invention to use these gases alone or to increase the oxygen content of air to any extent which may seem desirable.

While the foregoing specification is illustrative of the operation of the process of the present invention and the example cited exemplifies the advantages to be gained by its utilization in the art of petroleum refining, neither the specification nor the example are to be construed as imposing limitations upon the broad scope of the invention.

I claim as my invention:

1. A process for increasing the anti-detonation characteristics of a hydrocarbon oil comprising fractions of gasoline boiling range which comprises, subjecting the oil while in heated vaporous condition to the action of an aluminum oxide catalyst at a temperature above 840° F. and below 1200° F. for a time period greater than two seconds and less than twenty seconds, said catalyst comprising a precipitated and calcined aluminum hydroxide substantially free of occluded and absorbed salts and containing from 5 to 10% water.

2. A process for increasing the anti-detonation characteristics of a hydrocarbon oil comprising fractions of gasoline boiling range which comprises, subjecting the oil while in heated vaporous condition to the action of a monohydrate aluminum oxide catalyst at a temperature above 840° F. and below 1200° F. for a time period not substantially in excess of twenty seconds, said catalyst comprising a precipitated, purified, and calcined aluminum hydroxide.

3. A process for increasing the anti-detonation characteristics of a hydrocarbon oil comprising fractions of gasoline boiling range which comprises, subjecting the oil in heated vaporous condition to the action of an aluminum oxide catalyst at a temperature above 930° F. and below 1000° F. at atmospheric pressure for a time period greater than two seconds and less than twenty seconds, said catalyst comprising a precipitated and calcined aluminum hydroxide substantially free of occluded and absorbed salts and containing from 5 to 10% water.

HANS TROPSCH.